US008751382B2

(12) United States Patent
Shapiro et al.

(10) Patent No.: US 8,751,382 B2
(45) Date of Patent: Jun. 10, 2014

(54) CHAPTER 13 BANKRUPTCY TRUSTEE PAYMENT SYSTEM AND METHOD

(71) Applicant: PMT Network, LLC, Shark River Hills, NJ (US)

(72) Inventors: Joseph M. Shapiro, Union, NJ (US); Melinda D. Middlebrooks, Shark River Hills, NJ (US); Rudolph A. Moni, Jr., Shark River Hills, NJ (US)

( * ) Notice: Subject to any disclaimer, the term of this patent is extended or adjusted under 35 U.S.C. 154(b) by 0 days.

(21) Appl. No.: 13/686,628

(22) Filed: Nov. 27, 2012

(65) Prior Publication Data

US 2013/0138564 A1    May 30, 2013

Related U.S. Application Data

(60) Provisional application No. 61/564,890, filed on Nov. 30, 2011.

(51) Int. Cl.
*G06Q 40/00* (2012.01)
(52) U.S. Cl.
USPC ............................................. 705/39; 705/38
(58) Field of Classification Search
CPC .... G06Q 20/0855; G06Q 20/10; G06Q 40/02
USPC ............................................... 705/35, 37, 39
See application file for complete search history.

(56) References Cited

U.S. PATENT DOCUMENTS

| 7,856,385 B2 * | 12/2010 | Petr et al. ..................... 705/35 |
| 2011/0295739 A1 * | 12/2011 | Rice et al. ..................... 705/39 |

OTHER PUBLICATIONS

Russo, Albert, Standing Chapter 13 Trustee, ePay, Administering Chapter 13 Cases for the Trenton Vicinage of the District of New Jersey, SunTrust Bank (2013), available at http://www.russotrustee.com/?page_id=197.
TFS, Automate Your Success, Chapter 13 Payment, Reminder, and Records, Nationwide TFS, LLC (2013), available at https://www.tfsbillpay.com/.

* cited by examiner

*Primary Examiner* — Jagdish Patel
(74) *Attorney, Agent, or Firm* — McCarter & English, LLP (57) ABSTRACT

Exemplary embodiments are directed to a method of paying a trustee, including providing debtor information to a database, initiating at least one electronic fund transfer, transmitting the debtor information to a plurality of networks via a communications network, and delivering a payment to a trustee. The debtor information generally corresponds to a Chapter 13 bankruptcy debtor and the method further includes verifying the debtor information against a public database. The present disclosure is further directed to a system for paying a trustee, including a computer storage device to store debtor information and a processing device to initiate at least one electronic fund transfer, transmit the debtor information to a plurality of networks via a communications network, and deliver a payment to a trustee.

20 Claims, 8 Drawing Sheets

CHAPTER 13 BANKRUPTCY TRUSTEE PAYMENT SYSTEM AND METHOD

CROSS-REFERENCE TO RELATED APPLICATIONS

This application claims the benefit of commonly assigned U.S. Provisional Patent Application No. 61/564,890, which was filed on Nov. 30, 2011. The entire contents of the foregoing provisional patent application are incorporated herein by reference.

TECHNICAL FIELD

The present disclosure relates to methods and systems of paying a trustee and, more particularly, to making secure payments to a Chapter 13 bankruptcy trustee, wherein the secure payment method has improved efficiency and/or cost effective characteristics.

BACKGROUND

Generally, when a person files for bankruptcy under Chapter 13 of Title 11 of the United States Code, i.e., Chapter 13 bankruptcy, that person is considered a Chapter 13 debtor. A Chapter 13 debtor's goal is to repay some or all of their debts pursuant to a Chapter 13 plan of reorganization, generally known as a Chapter 13 plan. Typically, debtors may propose a plan that spans a minimum of about three (3) years and does not exceed a maximum of about five (5) years. During this time the Bankruptcy Code generally forbids the debtor's creditors from initiating or continuing collection efforts against the Chapter 13 debtor without leave of the Bankruptcy Court.

While in Chapter 13 bankruptcy, debtors are generally required to contribute their monthly disposable income to fund a Chapter 13 bankruptcy plan. Debtors are also generally required to make monthly payments using this disposable income for the entire period of the debtor's Chapter 13 plan. Accordingly, Chapter 13 debtors must generally make between about thirty-six (36) and about sixty (60) monthly trustee payments during the period of a Chapter 13 plan.

In most federal judicial districts, the Office of the United States Trustee appoints one or more standing. Chapter 13 trustees to collect the debtors' payments. Chapter 13 trustees are charged with the duty of collecting debtors' payments, accounting for debtors' payments, and distributing debtors' payments to the debtors' creditors pursuant to a Chapter 13 plan. Creditors receive disbursements in a manner permitted under the Bankruptcy Code and pursuant to an individual Chapter 13 debtor's plan.

Chapter 13 bankruptcy trustees generally collect debtors' trustee payments in a variety of ways. One way may be pursuant to a mandatory wage garnishment order entered by the Bankruptcy Court requiring a debtor's employer to make payments on behalf of the debtor. Another way may be to permit debtors to use an electronic fund transfer ("EFT") network to collect payments, e.g., an automated clearing house ("ACH") network. However, as is well known in the industry, a significant amount of Chapter 13 bankruptcy trustees in the United States require debtors to make monthly plan payments in a secure form (hereinafter "secure payment form"), e.g., a bank check, cashier's check, money order, and the like. To fulfill this secure payment form requirement, a majority of debtors must physically travel to a brick-and-mortar money service business, e.g., a local bank, post office, convenience store, and the like, to transform funds into a secure payment form that is accepted to a Chapter 13 bankruptcy trustee. As a result, a debtor is generally required to travel to a physical location and purchase a secure payment form every month for about thirty-six (36) to about sixty (60) months. In addition, when purchasing a secure payment form, a Chapter 13 debtor must remember to purchase the correct amount of payment.

Once the debtor has purchased a secure payment form, the debtor must next remember to physically notate essential bankruptcy case information on the secure payment, e.g., the trustee's name in the payee line, the debtor's case number in the notation section, reference to the debtor's case documents for essential information, and the like. In addition, a Chapter 13 debtor must generally retain proof of purchase of the secure payment form, which may be needed in the event that a debtor's secure payment form is not received by the Chapter 13 trustee or is mailed to the incorrect address. Under the current industry practice, debtors may either maintain a receipt from the purchase of the secure payment form or may retain a photocopy of the secure payment form as a proof of purchase. As is typical for current methods of paying a Chapter 13 bankruptcy trustee, a debtor must generally collect and maintain proof for the entire thirty-six (36) to sixty (60) month term of the debtor's Chapter 13 plan.

In addition, debtors must deliver the secure payment form to their Chapter 13 trustee for the entire thirty-six (36) to sixty (60) month period. Debtors generally mail the secure payment form either directly to the Chapter 13 bankruptcy trustee or to the trustee's lockbox service. In the case of a trustee lockbox service, debtors must generally use the United States Postal Service to deliver the secure payment form. Therefore, a majority of debtors must complete yet another physical task of mailing the secure payment form to the Chapter 13 bankruptcy trustee. In particular, a debtor must generally purchase an envelope, fill out the envelope by printing the debtor's Chapter 13 bankruptcy trustee's delivery address or specific lockbox address, purchase and apply the correct postage on the envelope, and deposit the envelope with the post office or other delivery system. Since a Chapter 13 trustee's payment address is not necessarily the same as a Chapter 13 trustee's office address, debtors must be certain that they use the correct address when making a trustee payment. Once the debtor's secure payment form is deposited in the mail, debtors generally maintain little if any proof that the secure payment form has been mailed to and received by the Chapter 13 bankruptcy trustee. Thus, the above-described process is overly complicated and burdensome to the debtor. In addition, the above-described process may be further complicated and subject to greater chances of error occurring when, e.g., a trustee has both a mailing address and a payment address, the amount of a debtor's payment changes and/or varies under the plan, and the like.

Further still, Chapter 13 is considered a wage earner's bankruptcy as Chapter 13 debtors generally work full-time jobs and receive regular monthly income. Since debtors may be required to contribute their monthly disposable income to fund a Chapter 13 bankruptcy plan, a significant amount of debtors generally maintain busy work schedules and have little free time. In light of the widespread adoption of online banking and bill pay, many Chapter 13 debtors may prefer to save time and energy by managing their monthly and/or recurring bills online and/or by using an automated payment system, e.g., convenient and automated online bill payment and management systems. However, as described above, the current system for paying a Chapter 13 trustee is overly burdensome, time consuming and antiquated. In particular, the current system creates mental and/or physical burdens of remembering to perform the described tasks at least once per month to make trustee payments for about thirty-six (36) to about sixty (60) months at the risk of dismissal of their Chapter 13 case. Debtors further risk their privacy as debtors must purchase and mail private information and/or secure Chapter 13 trustee payments using local money service businesses and/or the local postal service.

Additionally, as a result of the numerous steps required to complete the purchase and delivery of a secure form of payment, Chapter 13 bankruptcy trustee payments may be regularly lost, rejected and/or mismanaged during the course of a Chapter 13 plan. Unnecessary expenses and/or inconvenience to all parties involved, e.g., bankruptcy debtors, attorneys, trustees, Bankruptcy Courts, and the like, generally arises from litigation stemming from creditors' and/or trustees' motions to dismiss a debtor's case for failure to make timely payments to a trustee. At a minimum, a motion to dismiss typically jeopardizes the progress of a debtor's case and results in increased administrative expenses, including attorney fees and costs. More importantly, a motion to dismiss jeopardizes a Chapter 13 debtor's assets, and if granted, may leave a debtor vulnerable to continued collection efforts, e.g., immediate repossession, seizure and/or selling of a debtor's personal and/or real property.

Thus, a need exists for improved systems and methods for a Chapter 13 bankruptcy debtor to make payments to a Chapter 13 bankruptcy trustee. In particular, a need exists for a system and method that assists debtors to efficiently and automatically transform funds into a form that is acceptable to a plurality of bankruptcy trustees, assists debtors in efficiently and automatically delivering an acceptable form of trustee payment to a plurality of bankruptcy trustees, and assists debtors to efficiently and automatically manage and track the delivery and/or status of trustee payments. These and other needs are addressed and/or overcome by the systems and methods of the present disclosure.

SUMMARY

In one embodiment, the present disclosure provides a method of paying a trustee and, in particular, a method of making secure payments to a Chapter 13 bankruptcy trustee. The method generally includes providing debtor information to a database and initiating at least one electronic fund transfer. The exemplary method further generally includes transmitting the debtor information to a plurality of networks via a communications network and delivering a payment to a bankruptcy trustee. The debtor information corresponds to a Chapter 13 bankruptcy debtor. The method further includes verifying the debtor information against a public database, e.g., a bankruptcy database, court database, a combination thereof, and the like. Generally, the method includes transferring and depositing the debtor funds into a secure, outside bank account, and reporting data, e.g., verification data and/or deficiency data, from the plurality of networks to a debtor. Thus, the disclosed method provides an efficient and/or cost effective process of making a payment to a trustee.

In general, the at least one electronic fund transfer of the disclosed method can be, e.g., a one-time electronic fund transfer, a recurring electronic fund transfer, or a combination of the two. The electronic fund transfer can be performed via an electronic fund transfer network and can be an automated process. The debtor information can also be transmitted to a plurality of networks, e.g., an electronic fund transfer network, a payment printing network, a payment delivery network, and the like, in a standardized and/or normalized form, thereby providing desired debtor information to the plurality of networks in a form which is easily accessible and/or understood. The disclosed method can further include transforming the debtor funds from unsecure debtor funds to secure debtor funds and transforming the secure debtor funds into a payment form, e.g., a Chapter 13 bankruptcy trustee approved payment form.

In accordance with an exemplary embodiment of the present disclosure, a computer-implemented system is disclosed for paying a trustee and, in particular, a system for making secure payments to a Chapter 13 bankruptcy trustee is disclosed. In particular, the system includes a computer storage device and a processing device. The computer storage device generally stores debtor information. The processing device generally initiates at least one electronic fund transfer, transmits the debtor information to a plurality of networks via a communications network, and delivers a payment to a trustee.

In accordance with an exemplary embodiment of the present disclosure, a non-transitory computer readable medium storing instructions is disclosed, wherein execution of the instructions by a processing device causes the processing device to implement a method. In particular, the method generally includes providing debtor information to a database and initiating at least one electronic fund transfer. In general, the method further includes transmitting the debtor information to a plurality of networks via a communications network and delivering a payment to a trustee.

Therefore, the disclosed systems and methods provide a secure, automated/semi-automated, simplified and improved process of making a payment to a Chapter 13 bankruptcy trustee. Specifically, the disclosed systems and methods provide an efficient and automated transformation of debtor funds into a form of trustee payment acceptable to a plurality of bankruptcy trustees, delivery of the debtor funds in an acceptable form to a trustee, and an interface for verifying, managing and tracking the delivery of the trustee payment.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed systems and methods, reference is made to the accompanying figures, wherein.

DESCRIPTION OF EXEMPLARY
EMBODIMENTS

Exemplary embodiments of the present disclosure are directed to a method of paying a trustee and, in particular, a method of making payments to a Chapter 13 bankruptcy trustee in a form or forms of payment acceptable to a plurality of bankruptcy trustees. Forms of acceptable payment may include, but are not limited to, secure payments, e.g., money orders, cashier's checks, and the like, and/or unsecure payments, e.g., raw ACH transactions, and the like. However, it should be understood that the payment form implemented can vary based on what payment forms are deemed acceptable to a given trustee. The method generally includes providing debtor information to a database and initiating at least one electronic fund transfer. The exemplary method further generally includes transmitting the debtor information to a plurality of networks via a communications network and delivering a payment to a bankruptcy trustee. The debtor information corresponds to a Chapter 13 bankruptcy debtor. The method further includes verifying the debtor information against a public database, e.g., a bankruptcy database, court database, a combination thereof, and the like. Generally, the method includes transferring and depositing the debtor funds into a secure, outside bank account, and reporting data, e.g., verification data and/or deficiency data, from the plurality of networks to a debtor, a bankruptcy trustee, a bankruptcy attorney, and the like. Thus, the disclosed method provides an efficient and/or cost effective process of making a payment to a trustee.

In particular, exemplary embodiments of the disclosed methods provide a single point and/or location for Chapter 13 bankruptcy trustee payment initiation, payment automation, and payment management, thereby allowing Chapter 13 bankruptcy debtors, bankruptcy attorneys and/or bankruptcy trustees to, e.g., effectively transfer debtor funds from a debtor's financial institution to a secure third-party bank account, transform a debtor's funds into an acceptable trustee payment form, deliver a debtor's trustee payments to a Chapter 13 bankruptcy trustee using an acceptable delivery method, manage and track payments between Chapter 13 debtors and Chapter 13 trustees, and the like. The exemplary methods further automate one or more of these processes and provide a single-point user interface, i.e., a graphical user interface, rather than requiring multiple interfaces for users to access, perform, manage and organize the tasks separately on different systems. The disclosed systems and methods also allow a user to utilize a single system to manage all payment needs across multiple bankruptcy court districts and in multiple bankruptcy cases.

In general, each Chapter 13 bankruptcy trustee can have different payment requirements, e.g., acceptable forms of payment, payment locations, payment notation requirements, payment methods of delivery, and the like. Therefore, the disclosed systems and methods provide sufficient bankruptcy debtor information in a standardized and/or normalized form so as to permit a bankruptcy trustee and other entities involved in the electronic fund transfer network to conveniently obtain the desired information from a single source. In particular, the exemplary systems standardize and/or normalize the Chapter 13 bankruptcy trustee payment process for a bankruptcy debtor, a bankruptcy attorney and/or a bankruptcy trustee. For example, the exemplary systems can consolidate the plurality of fund transfer, fund transformation, payment notation, payment delivery and payment management systems and methods into a single point reference and interface. Thus, a bankruptcy debtor, a bankruptcy attorney and/or a bankruptcy trustee can interact with the electronic fund transfer system via a single-point interface to effectively transfer and/or transform a debtor's funds into a secure form acceptable to a Chapter 13 bankruptcy trustee. The Chapter 13 bankruptcy trustee payment process can be further normalized such that payments are delivered in a standardized manner and in accordance with the requirements of each one of the plurality of Chapter 13 bankruptcy trustees. The disclosed systems thereby collect data and Chapter 13 bankruptcy trustee payment-related information, automate the process of electronically transferring from the debtor's originating financial institution via an electronic fund transfer network, transform the debtor's funds into an acceptable payment form, and finally deliver and track the delivery of payments to Chapter 13 bankruptcy trustees. Thus, for example, the specific payment requirements, notations and/or formats for each Chapter 13 bankruptcy trustee are programmed in and/or stored in databases such that the user is not required to have intimate knowledge of the form and/or delivery requirements of each Chapter 13 bankruptcy trustee.

In further embodiments of the present disclosure, the system can perform a missing payment notification function to prevent the dismissal of a debtor's Chapter 13 bankruptcy case. Such an exemplary missing payment module can alert the user, e.g., a bankruptcy debtor, a bankruptcy attorney, a bankruptcy trustee, a debtor representative, and the like, to review the debtor's payment history against the debtor's Chapter 13 bankruptcy payment plan to help eliminate a risk of possible dismissal.

Figure 1:
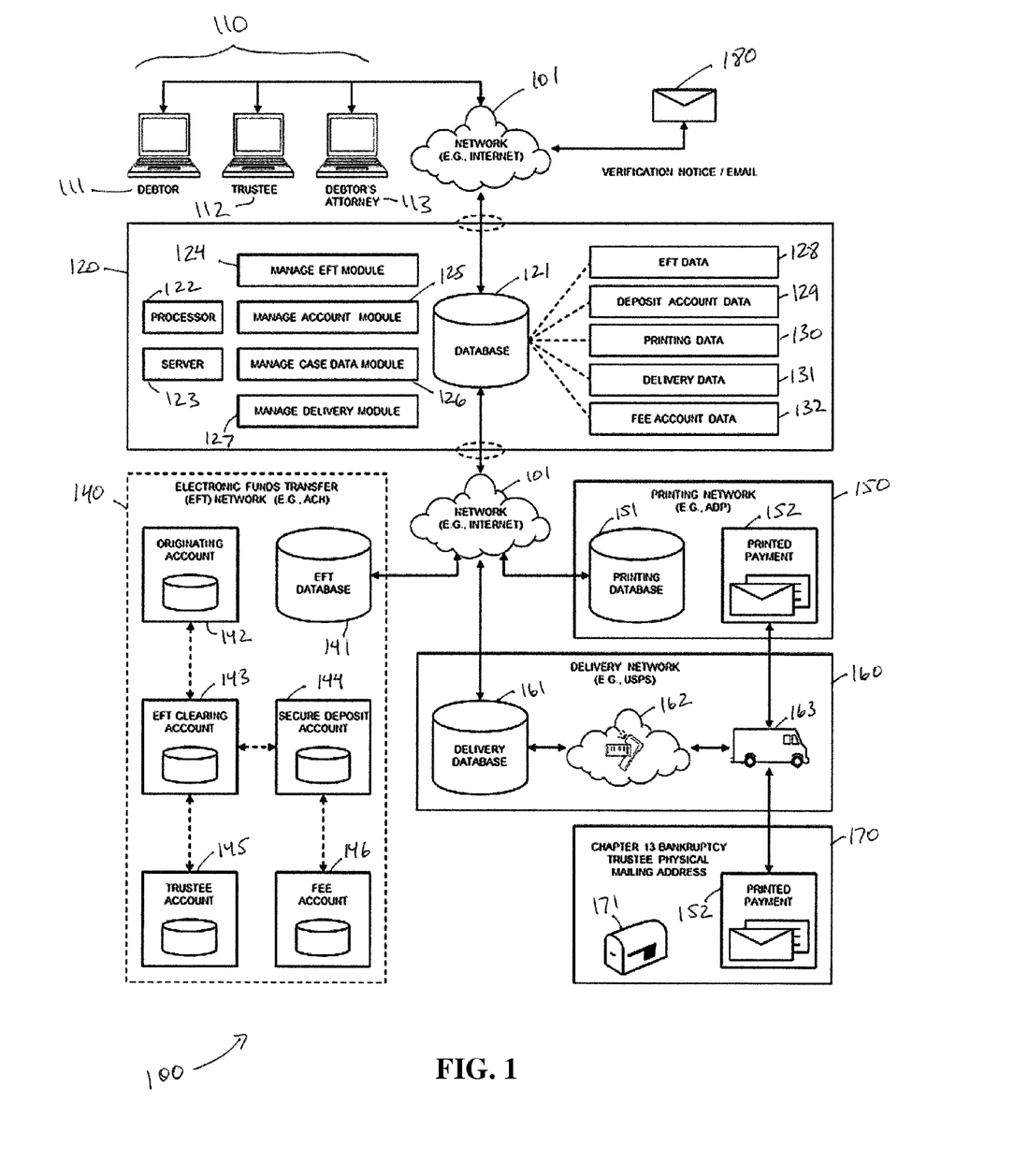
FIG. 1 is an exemplary bankruptcy trustee payment system implemented in accordance with the present disclosure.

With reference to FIG. 1, an exemplary bankruptcy trustee payment system 100 is illustrated, including the network 101, the user 110, the central unit 120, the electronic funds transfer network 140 (hereinafter "EFT network 140"), the printing network 150, the delivery network 160, the bankruptcy trustee network 170, and the verification 180. In particular, the network 101, e.g., the Internet, creates a communication media and/or network connecting the user 110, central unit 120, EFT network 140, printing network 150, delivery network 160, bankruptcy trustee network 170, and the verification 180. The network 101 thereby allows said elements of system 100 to transfer data, e.g., debtor information, bankruptcy case information, and the like, between the plurality of elements of system 100. Although illustrated as separate networks or units (e.g., separate vendors), in some exemplary embodiments, it should be understood that the system 100 may combine two or more networks or units into a single network or unit. For example, in some embodiments, the printing network 150 and the delivery network 160 may be combined into a single network. As a further example, in some embodiments, the EFT network 140 and the printing network 150 may be combined into a single network. As yet a further example, in some embodiments, the EFT network 140, the printing network 150 and the delivery network 160 may be combined into a single network. As yet a further example, in some embodiments, the central unit 120, the EFT network 140, the printing network 150 and the delivery network 160 may be combined into a single network. As yet a further example, in some embodiments, the central unit 120 and the EFT network 140 may be combined into a single network. The user 110 can be, e.g., the bankruptcy debtor 111, the bankruptcy trustee 112, the bankruptcy debtor's attorney 113, and the like, and can be connected to the network 101 through, for example, a computer. Although discussed herein as the bankruptcy debtor 111, as would be understood by one of ordinary skill in the art, depending on who is acting as a representative for the bankruptcy debtor 111 during implementation of the system 100, the bankruptcy debtor 111 can generally include the bankruptcy debtor 111, the bankruptcy debtor's attorney 113, any other representative acting for the bankruptcy debtor 111, and the like.

The central unit 120, e.g., the central computing device, includes the central database 121, which stores data specific to a plurality of bankruptcy debtors 111 entered by the user 110. For example, the central database 121 can store debtor information necessary for implementation of the system 100, such as, e.g., the bankruptcy case number, the debtor's full name and address, the joint debtor's full name and address, the trustee's name and address, the trustee's payment address, the trustee's required payment form, the debtor's banking information (e.g., routing number and account number), the payment plan, (e.g., payment amount and due date), secure bank account information, (e.g., deposit routing number and account number), and the like. The central database 121 can further store EFT data 128, deposit account data 129, printing data 130, delivery data 131, fee account data 132, and the like, which are also associated with the bankruptcy debtor 111, the plurality of networks of the system 100, and the specific information necessary for making a payment to a trustee 112. The information stored in the central database 121 specific to the plurality of bankruptcy debtors 111 can be entered into the central database 121 by the bankruptcy debtor 111 over the network 101 through, for example, a graphical user interface. Thus, the data stored in a standardized and/or normalized form in the central database 121 can then be distributed accordingly through the secure network 101 to the relevant entities and/or networks requiring the debtor information for implementation of the system 100.

In a further embodiment of the system 100, a verification 180 can occur in the process of a bankruptcy debtor 111 entering the debtor information into the graphical user interface and/or network and/or after the bankruptcy debtor 111 information is received in the central database 121. The verification 180 can include verifying the debtor information against a public database, e.g., a bankruptcy database, a court database, a combination thereof, and the like. Specifically, the verification 180 confirms that the information entered into the central database 121 by the bankruptcy debtor 111 is correct and/or accurately reflects the bankruptcy case information. The verification 180 depicted in FIG. 1 is connected to the network 101 and thereby provides feedback to the bankruptcy debtor 111 with respect to the plurality of steps implemented by the system 100 and the actions taken by the plurality of networks of the system 100. For example, the verification 180 can be, e.g., a notice by email, a notice by regular postal service, and the like, and can notify the bankruptcy debtor 111 whether the debtor information entered into the central database 121 has been verified or not. Thus, the debtor information distributed throughout the network 101 is confirmed to be correct and accurate information with respect to the bankruptcy debtor 111 and the specific bankruptcy case.

Figure 2:
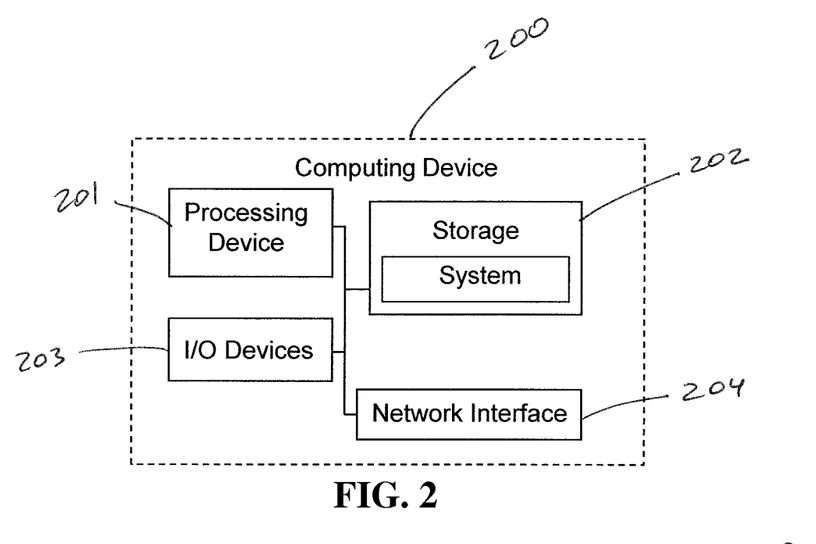
FIG. 2 is a block diagram of an exemplary computing device configured to implement embodiments of the bankruptcy trustee payment system.
Figure 3:
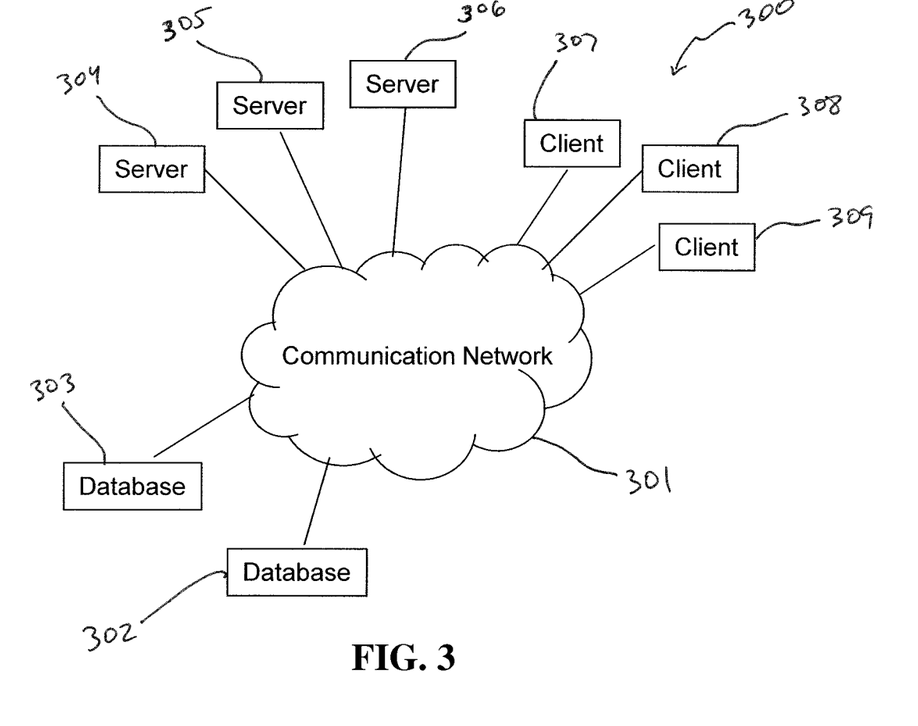
FIG. 3 is a block diagram of an exemplary computing system for implementing embodiments of the bankruptcy trustee payment system.

Still with reference to FIG. 1, the central unit 120 can further include the manage EFT module 124, the manage account module 125, the manage case data module 126, the manage delivery module 127, and the like. The manage EFT module 124 can organize, manage and distribute the applicable EFT data 128, e.g., the bankruptcy debtor's 111 bank account information, routing number, account number, and the like, and the fee account data 132, e.g., the secure bank account information (e.g., fee account 146), routing number, account number, and the like, specific to the plurality of bankruptcy debtors 111. The manage account module 125 can organize, manage and/or distribute the deposit account data 129, e.g., the scheduling of payments, payment amount, reoccurrence of payments, and the like, as specified by the bankruptcy debtor 111 and/or the bankruptcy plan, specific to the plurality of bankruptcy debtors 111. The manage case data module 126 can organize, manage and/or distribute bankruptcy case information stored in the central database 121 which is specific to a bankruptcy debtor 111, including the specific information and/or notations required on each payment by the bankruptcy trustee, e.g., printing data 130. The manage delivery module 127 can organize, manage and/or distribute delivery data 132, e.g., the bankruptcy trustee 112 delivery address, the bankruptcy trustee 112 lockbox delivery address, and the like, which is specific to the plurality of bankruptcy debtors 111. The processor(s) 122 and the server (s) 123 of the central unit 120, which are discussed in greater detail below with respect to FIGS. 2 and 3, are implemented in system 100 to process and distribute data necessary for permitting a bankruptcy debtor 111 to make a payment to a bankruptcy trustee 112 through the manage EFT module 124, the manage account module 125, the manage case data module 126, and the manage delivery module 127.

The EFT network 140 is connected to the central database 121 by the network 101 and can include, e.g., the EFT database 141, the originating account 142, the EFT clearing account 143, the secure deposit account 144, the trustee account 145, the fee account 146, and the like. Utilizing the network 101 and the standardized and/or normalized debtor and bankruptcy case information collected in the central database 121, the EFT database 141 can collect the applicable information for use with the other elements of the EFT network 140. For example, the EFT database 141 can collect the EFT data 128, the deposit account data 129, and the like, for distribution among the EFT network 140 elements. Using the information stored in the EFT database 141, the EFT network 140 can initiate an electronic fund transfer for the amount specified in the debtor information from the originating account 142, e.g., the debtor's bank account. The EFT network 140 can automatically withdraw the specified amount of payment from the originating account 142 and can optionally electronically and/or physically transfer the funds to an EFT clearing account 143, whereby the funds transferred are, e.g., checked for accuracy based on the information in the EFT database 141 and cleared to proceed to the next step of the EFT network 140. The debtor's funds can then be transferred and deposited into a secure deposit account, i.e., an outside, secure bank account, thus making the funds no longer accessible to the debtor. The transfer and deposit of the debtor's funds from the originating account 142 to the secure deposit account 144 transforms the debtor's unsecure funds into secure funds. Alternatively, if acceptable to one of a plurality of bankruptcy trustees 112, the debtor's funds can then be transferred and deposited directly into a bankruptcy trustee's account 145.

Once the debtor funds have been transformed into secure funds, transferred, and the like, a fee for, e.g., the EFT network 140, printing network 150, delivery network 160, the operator of an exemplary bankruptcy trustee payment system 100, and the like, can optionally be deducted and deposited into the fee account 146 based on, e.g., a previously specified rate. The remaining debtor's secure funds can then be optionally transferred and deposited to the trustee account 145, whereby the trustee 112 receives the bankruptcy payment from the bankruptcy debtor 111 and distributes the debtor's funds to the debtor's creditors accordingly. However, rather than an electronic transfer of the debtor's secure funds to the trustee account, based on previously specified methods by which the trustee 112 desires to receive the debtor's bankruptcy payment, the EFT network 140 can transfer the secure funds from the secure deposit account 144 over the network 101 to the secure deposit account 144, from which a secure payment form can be printed by the printing network 150.

With reference now to the printing network 150 of FIG. 1, the printing database 151 can receive over the network 101 the data applicable to the printing network 150, e.g., the account and routing number associated with the secure deposit account 144, the amount of the bankruptcy payment to be made from the secure deposit account 144, the notations required by the trustee 112 to be made on the payment, the debtor's bankruptcy case information, the bankruptcy trustee's delivery address or lockbox address, and the like. The printing database 151 can then implement the data applicable for a specific debtor 111 to transform the debtor's funds into an acceptable payment form, i.e., a printed payment 152. For example, the printed payment 152 can be a bank and/or cashier's check and is printed with the notations required by the specific bankruptcy trustee 112.

The delivery database 161 of the delivery network 160 receives over the network 101 the data applicable to the delivery network 160, e.g., the bankruptcy case information, the trustee 112 delivery address or lockbox address, and the like. The delivery network 160, e.g., the U.S. Postal Service, can further include delivery tracking methods 162, e.g., barcode scanning, certified mail, and the like, and a physical delivery method 163 by which the printed payment 152 can be delivered to the bankruptcy trustee 112. The physical delivery method 163 of the delivery network 160 can be used to deliver the debtor 111 payment to the bankruptcy trustee network 170, which can include the bankruptcy trustee address 171, e.g., the trustee 112 delivery address or lockbox address. Thus, the debtor 111 bankruptcy payment, i.e., the printed payment 152, can be delivered to the trustee 112 at the bankruptcy trustee address 171 and further distributed by the trustee 112 to the at least one creditor of the debtor 111. Although discussed herein as creating a printed payment 152 for physical transfer or delivery of the debtor funds to the trustee 112, in some exemplary embodiments, the debtor funds may be transferred from the secure deposit account 144 to a trustee deposit account (not shown) by electronic transfer means. Further, in some exemplary embodiments, the debtor funds may be transferred from the originating account 142 directly to the trustee deposit account (not shown).

It should further be noted that the verification 180 discussed above can occur after any and/or all steps of the system 100 described herein, thereby providing continuous and accurate feedback to the debtor 111, trustee 112, debtor's attorney 113, and the like, regarding the current status of the debtor's bankruptcy payment. Thus, the verification 180 can notify the debtor 111 through, e.g., a graphical user interface, email, and the like, about, e.g., the accuracy of the information entered into the central database 121, the transfer of funds from the originating account 142 to the secure deposit account 144, the creation of the printed payment 152, the delivery of the printed payment 152 to a trustee address 171, the payment of debtor funds to the debtor's creditors, and the like, over the network 101.

FIG. 2 is a block diagram of an exemplary computing device 200, e.g., the central unit 120, configured to implement some embodiments of the system 100. The computing device 200 can be a mainframe, personal computer (PC), laptop computer, workstation, server, handheld device, such as a portable digital assistant (PDA), and the like. In the illustrated embodiment, the computing device 200 includes a processing device 201, such as a central processing unit, and can include storage 202. The computing device 200 can further include input/output devices 203, such as a display device, keyboard, touch screen, mouse, printer, and the like, and can include a network interface 204 to facilitate communication between the computing device 200 and other devices communicative coupled to a network.

The storage 202 stores data and instructions and can be implemented using non-transitory computer readable medium technologies, such as a floppy drive, hard drive, tape drive, solid state storage devices, Flash drive, optical drive, read only memory (ROM), random access memory (RAM), and the like. For example, the storage 202 can store, e.g., debtor bankruptcy case information, debtor bank account information, and the like. Applications, such as an embodiment of the system 100, or portions thereof, can be resident in the storage 202 and can include instructions for implementing the applications. The storage 202 can be local or remote to the computing device 200. The processing device 201 operates to execute the applications in storage 202, such as the system 100, by executing instructions therein and storing data resulting from the executed instructions, which can be presented via, for example, a graphical user interface (GUI).

FIG. 3 is a block diagram of an exemplary computing system 300 configured to implement one or more embodiments of the system 100. The computing system 300 includes servers 304-306 operatively coupled to clients 307-309, e.g., debtors 111, trustees 112, debtor's attorneys 113, and the like, via a communication network 301, which can be any network over which information can be transmitted between devices communicatively coupled to the network. For example, the communication network 301 can be the Internet, Intranet, virtual private network (VPN), wide area network (WAN), local area network (LAN), and the like. The computing system 300 can include repositories or database devices 302-303, which can be operatively coupled to the servers 304-306, as well as to clients 307-309, via the communications network 301. The servers 304-306, clients 307-309, and database devices 302-303 can be implemented as computing devices. Those skilled in the art will recognize that the database devices 302-303 can be incorporated into one or more of the servers 304-306 such that one or more of the servers can include databases.

In exemplary embodiments, the system 100 can be distributed among different devices, e.g., servers, clients, databases, in the communication network 301 such that one or more components of the system 100, or portions thereof, can be implemented by different devices in the communication network 301. For example, in illustrative embodiments, the central unit 120, or portions thereof, can be implemented by the server 304, the EFT network 140, or portions thereof, can be implemented by the server 305, and the printing network 150, or portions thereof, can be implemented by the server 306. Clients 307-309 can represent the debtor 111, trustee 112, the debtor's attorney 113, and the like, implementing a computing device having a web browser and/or a graphical user interface, where the clients 307-309 can use the computing devices to input the debtor and bankruptcy case information into the central database 121 over the network 301 and further receive verification information and/or bankruptcy payment status information over the network 301 in a format understandable to the clients 307-309. The database devices 302 and 303 can be configured to store a variety of information relevant and/or applicable to the bankruptcy case and the making of a bankruptcy payment by a debtor 111 to a trustee 112, e.g., the debtor 111 name, debtor 111 address, debtor 111 bank account information, bankruptcy case information, and the like.

It should be noted that the exemplary embodiments of system 100 can include a variety of database devices 302-303 having various database file configurations and data file formats. The database devices 302-303 can also include, e.g., software programs, programming code and program modules. Database file configurations can be, e.g., a Microsoft Office Excel Comma Separated Values File format, a Microsoft Access Database File format, and the like. The Microsoft Office Excel Comma Separated Values File formatted database file can, for example, contain data provided from an electronic fund transfer database, while a Microsoft Access Database File database file can contain data retrieved or read from a Microsoft Office Excel database file after the data has been modified or reviewed by a bankruptcy debtor, a bankruptcy attorney and/or a bankruptcy trustee. Data files can contain, e.g., text, graphic, media or other data formats pertinent to storing or filing information or documents electronically. The software programs, code or modules can be in a programming language, machine code or other format usable by a microprocessor, computer and/or computing system. Some of the database files, data files or programs can be stored on, e.g., non-volatile hard drives, or within, e.g., solid-state memory device, or the like.

As discussed herein, the database, database file, data file, program, code, program module, and the like, can be stored in a data store. A data store generally includes, e.g., single and/or multiple non-volatile memory device(s), other types of non-volatile computer readable mediums adapted to store databases, database files, data files, programs, codes or program modules, and the like. The non-volatile memory device (s) can include one or more types of non-volatile memory, including, e.g., electro-mechanical, magnetic, optical, flash, other solid state or non-solid state types of non-volatile memory, and the like. As would be understood by one of ordinary skill in the art, database file information, data file information and software do not always reside in non-volatile memory. Instead, database file information, data file information and software can also be stored temporarily during operation of the exemplary systems in various types of volatile memory. Furthermore, other types of computer readable mediums can include, without limitation, e.g., magnetic and optical computer readable mediums, flash memory, battery backed volatile memory, reasonable facsimiles or derivations thereof, and the like.

Figure 4:
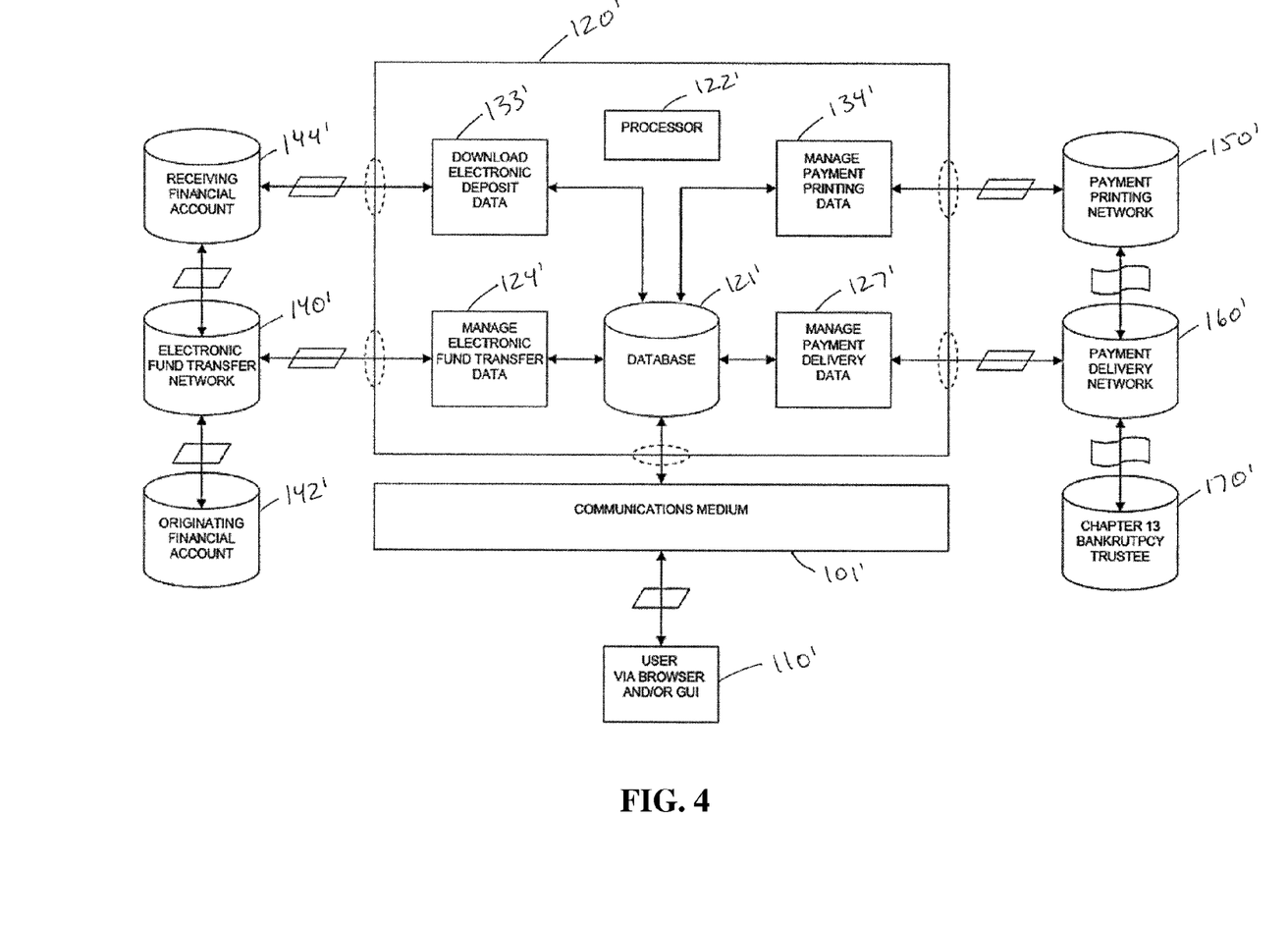
FIG. 4 is an alternative exemplary bankruptcy trustee payment system implemented in accordance with the present disclosure.

With reference now to FIG. 4, a block diagram of an alternative exemplary bankruptcy trustee payment system 100' implemented in accordance with the present disclosure is presented. In particular and similar to system 100 of FIG. 1, system 100' can also include a user 110', a network 101', e.g., a communications medium, a central unit 120', an EFT network 140', a printing network 150', a delivery network 160', and a bankruptcy trustee network 170', all of which are connected by the network 101'. As discussed above with respect to system 100, although illustrated as including a plurality of separate networks or units, in some exemplary embodiments, system 100' may combine two or more of the networks or units into a single network or unit. The user 110' further includes, e.g., the debtor 111', the trustee 112', the debtor's attorney 113', and the like, who provide bankruptcy case information to the central database 121'.

The central unit 120' also includes a central database 121', a processor 122', a manage EFT module 124', and a manage delivery module 127', which perform substantially similar processes as the equivalent components in system 100. In addition, the central unit 120' can include the download electronic deposit data (DEDD) module 133' and the manage payment printing data 134'. The DEDD module 133' can, for example, obtain the information applicable to a specific debtor 111' required for transferring and depositing the debtor's funds to a secure bank account, e.g., bankruptcy case information, debtor 111' address, debtor 111' bank account information, and the like. The manage payment printing data module 134' can obtain the information applicable to a specific debtor 111' required for transforming a debtor's funds into a payment form as is specified by a specific trustee 112' associated with the specific debtor 111'. For example, the manage payment printing data module 134' can obtain the notations the trustee 112' requires on the payment form, e.g., check, such as the debtor's name and address, the bankruptcy case information, the trustee information, the location of deposit of the debtor's funds, and the like.

The EFT network 140' performs functions substantially similar to those of the EFT network 140 of system 100, including, but not limited to, obtaining and storing in the EFT database 141 applicable information from the central database 121' through the manage EFT module 124' in order to withdraw a specified amount from the originating account 142' to make the bankruptcy payment to the trustee 112'. The EFT network 140' can further transfer the withdrawn debtor 111' funds to a secure deposit account 144', i.e., a receiving financial account, in order to transform the debtor's unsecure funds into secure funds. The secure deposit account 144' can in turn obtain necessary information from the central database 121' through the DEDD module 133' for correctly and accurately depositing the debtor's secure funds and preparing them for transfer to the printing network 150'.

According to system 100' of FIG. 4, the secure debtor 111' funds can be transferred to the printing network 150' by implementing the DEDD module 133' to transfer the applicable deposit and/or withdrawal data to the central database 121' and then by implementing the manage payment printing data module 134' to transfer the applicable deposit and/or withdrawal data to the printing network 150'. As this information is being transferred, the manage payment printing data module 134' can further obtain the printing information specified by a specific trustee 112' from the central database 121', thereby providing all necessary information to the printing network 150' for preparing a printed payment 152. The printing network 150' performs functions substantially similar to the printing network 150 of system 100, thereby preparing a printed payment 152 for delivery to the trustee 112'.

The delivery network 160' can obtain the information necessary for delivering the printed payment 152 to the trustee 112' from the printing network 150', the central database 121' through the manage delivery module 127', or a combination of the two. In particular, the delivery network 160' performs functions substantially similar to the delivery network 160 of system 100, thus delivering the printed payment 152 with the required notations to the bankruptcy trustee network 170', i.e., the trustee 112', the trustee's lockbox, or an alternative address supplied by the trustee 112'. Although discussed herein as creating a printed payment 152 for physical transfer or delivery of the debtor funds to the trustee 112', in some exemplary embodiments, the debtor funds may be transferred from the secure deposit account 144' to a trustee deposit account (not shown) by electronic transfer means. Further, in some exemplary embodiments, the debtor funds may be transferred directly from the originating account 142' to a trustee deposit account (not shown) by electronic transfer means. It should be understood that although the verification 180 of system 100 is not illustrated in the block diagram of FIG. 4, similar to system 100, the verification 180 can be implemented at any and/or all steps of the system 100' described herein.

Figure 5:
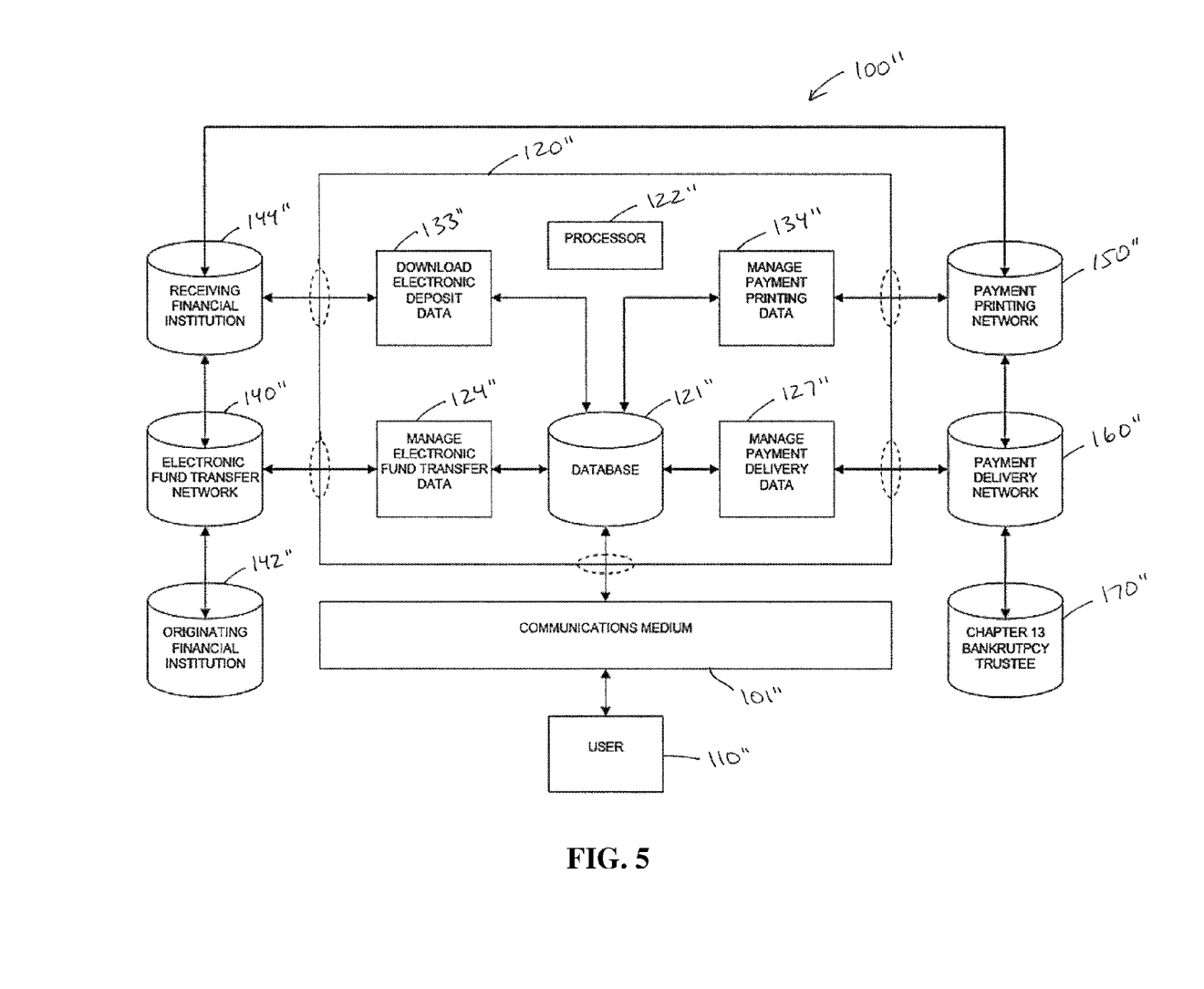
FIG. 5 is an alternative exemplary bankruptcy trustee payment system implemented in accordance with the present disclosure.

With reference now to FIG. 5, a block diagram of yet another exemplary bankruptcy trustee payment system 100" implemented in accordance with the present disclosure is provided. Specifically, the system 100" is substantially similar to the system 100' of FIG. 4, including substantially similar networks, e.g., the user 110", the network 101", i.e., a communications medium, the central unit 120", the EFT network 140", the printing network 150", the delivery network 160", the bankruptcy trustee network 170", the verification 180 (not shown), and the like. Further, system 100" includes an originating account 142" and a secure deposit account 144", i.e., a receiving financial institution. Thus, system 100" functions in a substantially similar manner as system 100'. However, in addition to the originating account 142" transferring the relevant data to the printing network 150" by implementing the DEDD module 133" and the manage payment printing data module 134" through the central database 121" over the network 101" as described above with reference to FIG. 4, system 100" is also capable of transferring the relevant data from the originating account 142" to the printing network 150" directly over the network 101" as can be seen at the top of FIG. 5. Thus, rather than performing additional steps and gathering additional information from the central database 121", the EFT network 140" can directly request, manage and forward the necessary information to the printing network 150". In some exemplary embodiments, rather than implementing a printing network 150", the transfer of funds from the secure deposit account 144" to the trustee 170" may be performed electronically. Further, in some exemplary embodiments, rather than implementing a printing network 150", the transfer of funds from the originating account 142" of a financial institution directly to the trustee 170" may be performed electronically.

Figure 6:
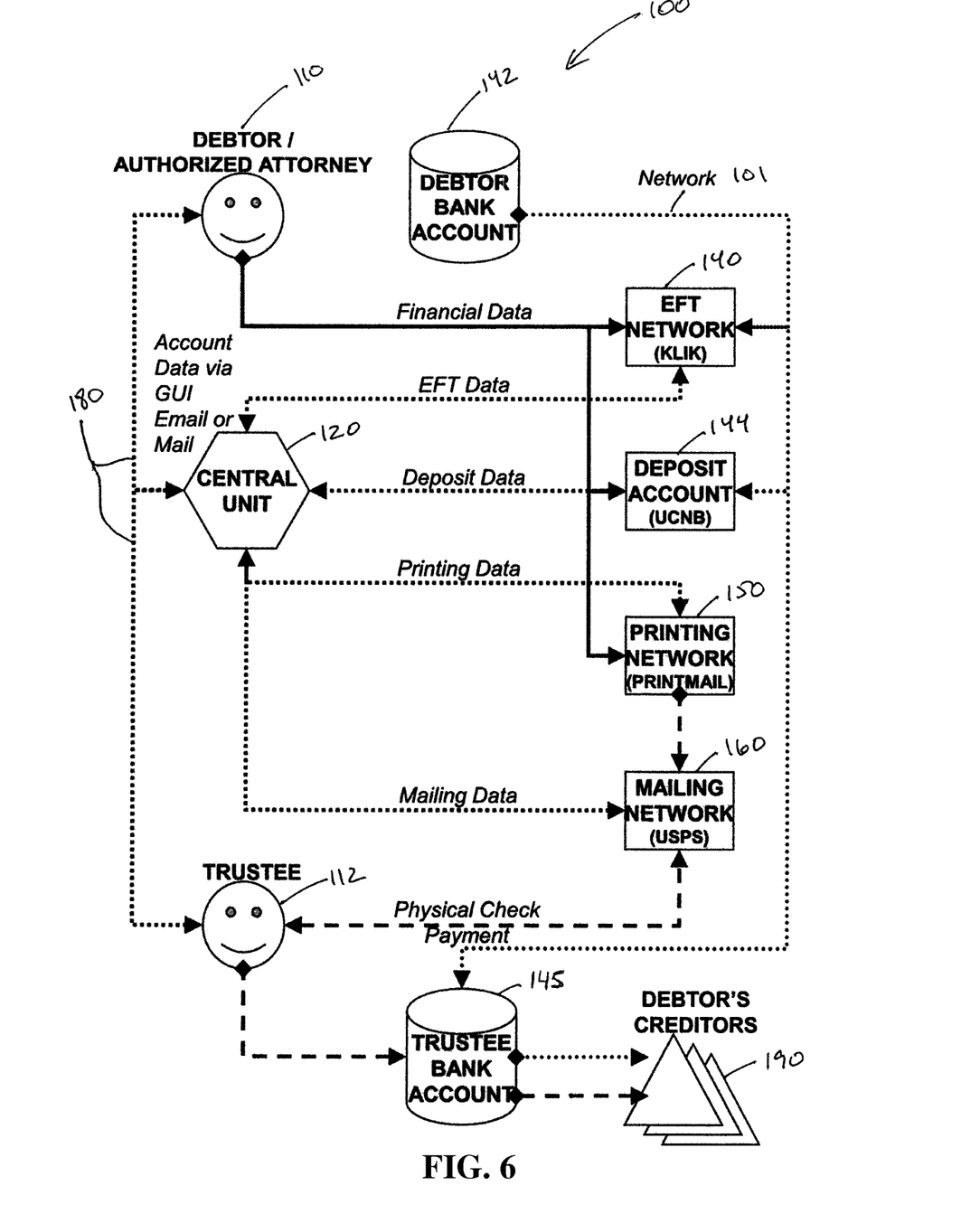
FIG. 6 is a flowchart illustrating an exemplary process performed using embodiments of the bankruptcy trustee payment system.

Turning now to FIG. 6, a flowchart illustrating an exemplary process performed using embodiments of the bankruptcy trustee payment system 100 is presented. In particular, FIG. 6 depicts elements of system 100 substantially similar to those of FIG. 1, e.g., a user 110, a central unit 120, an EFT network 140, a printing network 150, a delivery network 160, i.e., a mailing network, a bankruptcy trustee network 170, and the like. Network 101 connects the plurality of networks of the system 100 and a verification 180 is also provided. As can be seen from FIG. 6, the user 110, i.e., a debtor 111, a debtor's attorney 113, an authorized attorney, and the like, can provide information, e.g., financial data, debtor 111 information, and the like, to the EFT network 140, which further includes an EFT database 141 (not shown). The EFT network 140 can then transfer the EFT data to the central unit 120, which includes a central database 121 (not shown) for storing the information for a plurality of debtors 111 participating in the system 100. In particular, each network of the system 100 can collect, store (in an associated database) and distribute the bankruptcy case information to other networks associated with the system 100 and/or to the central unit 120 for storage in a standardized and/or normalized form.

The debtor information provided by the user 110 can further be distributed by the network 101 to the secure deposit account 144 and the printing network 150. Thus, the EFT network 140 can collect the information, including data relevant to the amount of bankruptcy payment to be made to the trustee 112 and the time of such payments, initiate the withdrawal of the debtor's funds from the originating account 142, i.e., the debtor's bank account, and transfer the unsecure debtor funds from the originating account 142 to the secure deposit account 144, i.e., the deposit account, thereby converting the unsecure debtor funds into secure funds. By communicating with the central unit 120 over the network 101, the printing network 150 can receive information relevant to the specific payment to be made to a trustee, e.g., the amount of payment by the debtor, the bankruptcy case information, the notations required by the trustee, and the like, and can effectively transform the debtor's funds into an acceptable payment form, e.g., a cashier's check, and the like. The printing network 150 then transfers the payment form approved by the specific trustee 112 to the delivery network 160 and the delivery network 160 obtains the applicable data for delivering the printed payment 152 (not shown) to the trustee 112 from the central unit 120. Thus, a physical payment, e.g., a cashier's check, is delivered to the trustee 112 at, for example, the trustee's physical address, lockbox address, an address specified by the trustee, and the like. Once delivered, the trustee 112 can deposit the physical payment, e.g., a cashier's check, into the trustee bank account 145 held by the trustee 112, effectively transferring the debtor's funds into the trustee bank account 145. Optionally, the debtor's funds can be electronically transferred directly from the secure deposit account 144 over the network 101 to the trustee network 170, e.g., a trustee account 145. Optionally, the debtor's funds can be electronically transferred directly from the debtor bank account 142 over the network 101 to the trustee bank account 154. The trustee 112 can then reach the secure debtor bankruptcy payment and distribute it accordingly to the at least one debtor creditor 190.

Still with reference to FIG. 6, as previously disclosed herein, the verification 180 can occur after particular steps and/or after each step taken by the system 100. As depicted in FIG. 6, the verification 180 can originate from the central unit 120, which collects the applicable information from all associated networks for each bankruptcy debtor 111 participating in the system 100, and then distributes the information to the user 110 and/or the trustee 112 in order to provide a tracking system of the debtor's bankruptcy payment to the trustee. The tracking system, i.e., verification 180, can provide account data via, e.g., a graphical user interface, an email, postal service, and the like, thereby providing information easily accessible, current, and understandable to the user 110. However, it should be understood to those of ordinary skill in the art that the verification 180 can originate at, e.g., the central unit 120, each participating network of the system 100, a combination of said locations, and the like. In particular, the verification 180 can obtain tracking data from, e.g., the EFT network 140 when the debtor's funds have been withdrawn from the originating account 142 and transferred to the secure deposit account 144, the printing network 150 when it has processed and converted the debtor's funds into a payment form acceptable to the trustee 112, the delivery network 160 when it has delivered the payment form to the trustee 112, and the like. Thus, the user 110 is provided with a method of tracking the user's 110 bankruptcy payment throughout the system 100 at least until it reaches the trustee 112 in an understandable and/or informative manner.

Figure 7:
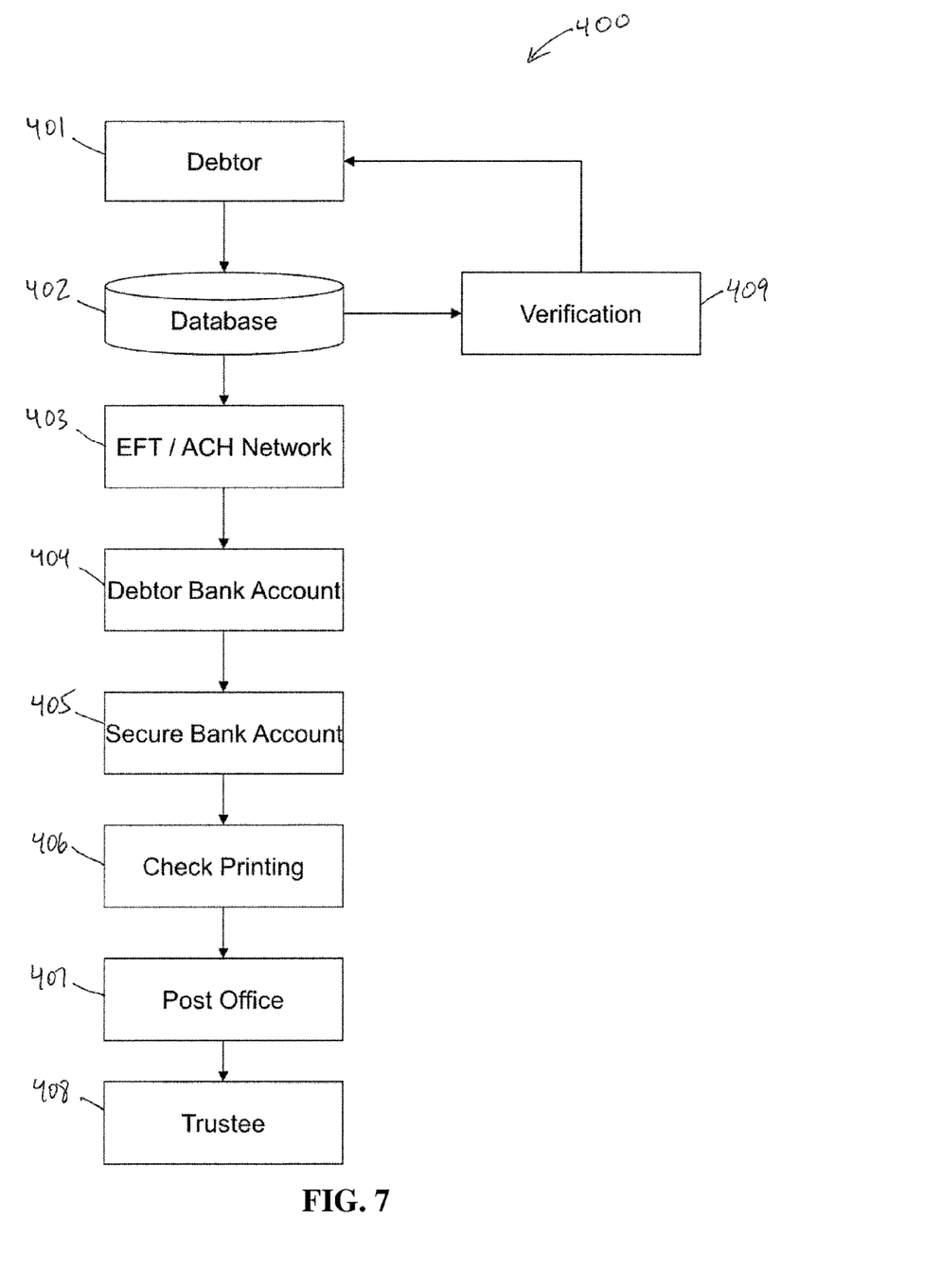
FIG. 7 is an alternative flowchart illustrating an exemplary process performed using embodiments of the bankruptcy trustee payment system.

With reference now to FIG. 7, an alternative flowchart illustrating an exemplary process performed using embodiments of the bankruptcy trustee payment system 400 is depicted. Specifically, a debtor, e.g., a debtor 111, a trustee 112, a debtor's attorney 113, a debtor's authorized agent, and the like, can initially provide debtor information and/or bankruptcy case information over the network 101 depicted by arrows to the central database 121 (401). The central database 121 can then manage, organize in a standardized and/or normalized form, and/or store the information relevant to specific debtors 111 participating in the bankruptcy payment system 400 (402). Further, the central database 121 can verify the debtor information against a public database, e.g., a bankruptcy database, a court database, and the like, to confirm that the data provided is accurate (409). If the verification step is successful, the system 400 can proceed as discussed below. However, if the verification step reveals that the debtor information provided previously to the central database 121 is inaccurate and/or that additional information is required, the system 400 can contact the debtor 111 over the network by, e.g., a graphical user interface, email, postal service, and the like, to request the additionally required information. The verification step can then repeat to confirm that the new information provided is sufficient to proceed in the system 400.

Still with reference to FIG. 7, once the debtor information has been verified, the central database 121 can transfer the debtor information to the EFT network 140, e.g., an automated clearing house (ACH), for initializing and transferring the debtor's funds from an unsecure account to a secure account (403). As would be apparent to those of ordinary skill in the art, the ACH can include an originator, an originating depository financial institution (ODFI), a receiving depository financial institution (RDFI), a receiver, ACH operators, and the like. In particular, the originator can be, e.g., an individual, corporation or other entity that initiates entries into the ACH network. The ODFI can be a financial institution that participates in the system 100 that originates the ACH entries and the RDFI is a financial institution qualified to receive ACH entries that abide by the NACHA Operating Rules. Further, the receiver can be an individual, corporation or other entity that has authorized an originator to initiate a credit and/or debit entry to a transaction account held at an RDFI and an ACH operator can be, e.g., clearing facilities through which financial institutions transmit and/or receive ACH entries.

Further still, the EFT network 140 can withdraw the specified amount of debtor funds from an originating account 142, e.g., a debtor's bank account, (404), confirm that the funds have been cleared, and transfer the debtor funds into a secure deposit account 144 (405). Thus, the unsecure funds can be converted into secure funds. The EFT network 140 can further proceed by electronically transferring the debtor's payment to the trustee account 145 or transfer the necessary information to the printing network 150 for creating a payment form suitable for a trustee 112 (406), e.g., a check with the specified notations. As previously discussed above, once a payment form, e.g., a printed method 152, has been created by the printing network 150, the delivery network 160, e.g., the post office, can obtain the printed payment 152 and the delivery information necessary for completing the payment, e.g., the trustee address, the lockbox address, an address specified by the trustee 112, and the like (407). The delivery network 160 can then deliver the bankruptcy debtor's specified payment to the address and/or location specified by the trustee 112 and the trustee 112 can proceed by distributing the debtor's payment to the appropriate creditors (408). Further, as stated above, the verification step (409) can occur after any and/or all steps of the process discussed herein, thereby providing the user 110 a convenient and effective tracking system for determining the status of the debtor's payment throughout system 400.

Figure 8:
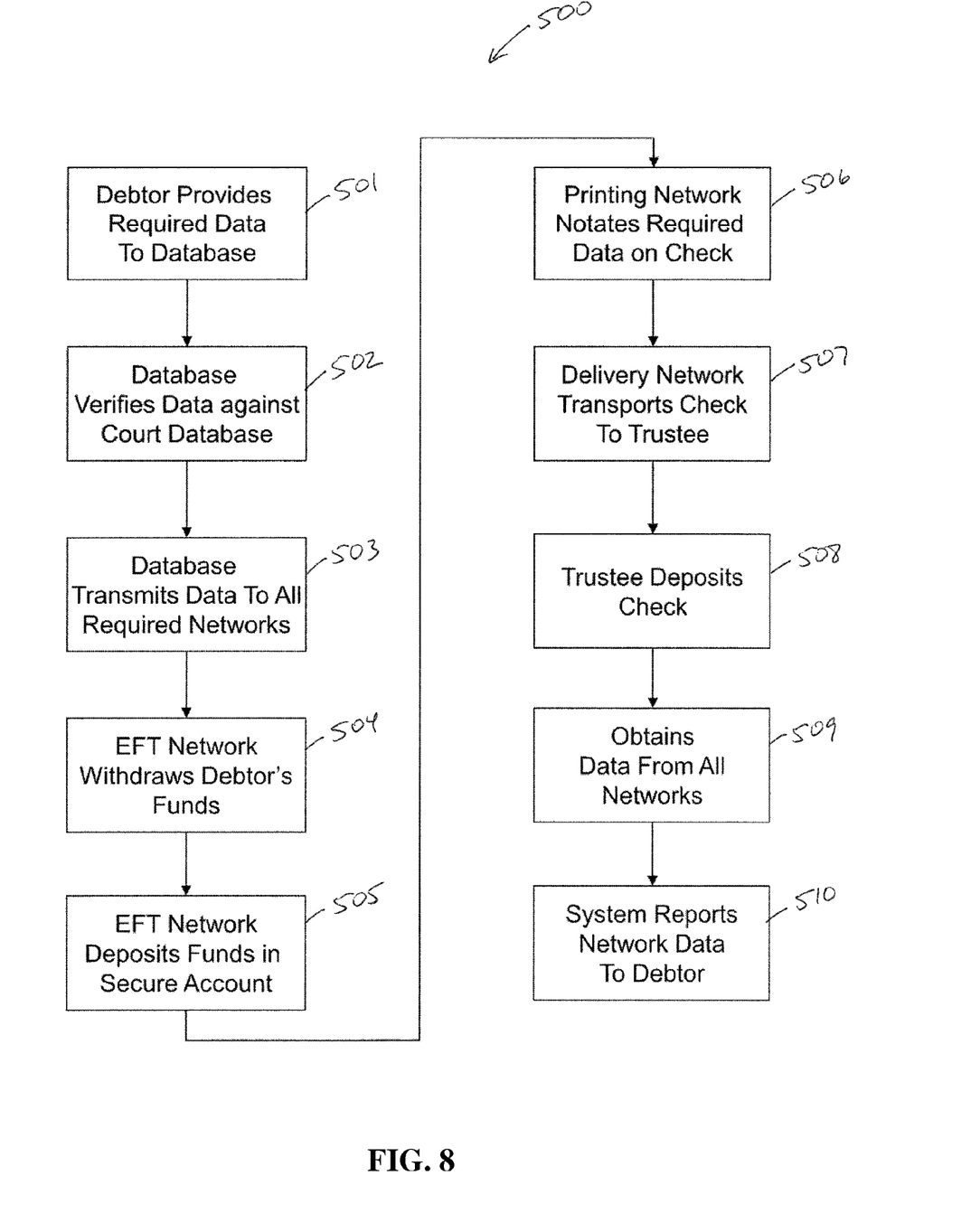
FIG. 8 is an alternative flowchart illustrating an exemplary process performed using embodiments of the bankruptcy trustee payment system.

Turning now to FIG. 8, a flowchart illustrating an exemplary process performed using embodiments of the bankruptcy trustee payment system 500 is presented. It should be noted that each step of the process depicted in FIG. 8 is connected by a network 101, e.g., the internet, and information at each step can be sent over the network 101 to any other step in the process. Initially, the bankruptcy debtor 111 enters the required data, i.e., data essential for making a payment to a bankruptcy trustee, via a communication method, e.g., a browser, graphical user interface, and the like, and the required data is provided to and stored in the central database 121 over the network 101 (501). Once the central database 121 has received the required data, the data is verified against a public database, e.g., a court database, a bankruptcy database, a combination thereof, and the like, for accuracy (502). Specifically, the verification process confirms that the debtor's 111 data matches the data in the public database. The central database 121 can then transmit the confirmed data to all of the relevant networks/entities of the system 500, e.g., the electronic funds transfer network 140, the printing network 150, the delivery network 160, and the bankruptcy trustee network 170 (503). If the data has been previously verified, the debtor 111 is then permitted to initiate a payment/electronic fund transfer, e.g., a one-time payment, a recurring payment, a combination of both, and the like, from the originating account 142, e.g., the debtor's checking account, savings bank account, and the like, via an electronic fund transfer network 140 ("EFT network 140"). The automated withdrawal of the debtor funds via the EFT network 140 is generally made on a payment schedule, although the debtor 111 can make a one-time payment as well, and the payment amount is generally specified by the debtor 111 and/or the bankruptcy plan (504).

Still with reference to FIG. 8, once the debtor funds have been withdrawn from the originating account 142, the debtor funds are transferred over the EFT network 140 and deposited into a secure deposit account 144, i.e., an outside, secure bank account (505). Thus, the originally unsecure debtor funds are transformed into secure funds, since the debtor 111 cannot reach and/or manage the funds transferred to the secure deposit account 144. The debtor funds are then transformed into an acceptable final payment form 152, i.e., a payment form accepted by the Chapter 13 bankruptcy trustee 112, such as a bank check, cashier's check, and the like, by printing the necessary debtor and bankruptcy case information as specified by the bankruptcy trustee 112 via a printing network 150 onto the final payment 152 form (506). The delivery network 160 then delivers debtor's final payment 152 form, along with all required data notations, via an acceptable delivery method 162, e.g., United States Postal Service, FedEx™, and the like, to a specific bankruptcy trustee 112 at, for example, the bankruptcy trustee address 171 (507). The bankruptcy trustee 112 can then deposit the final payment 152 into, e.g., a trustee account 145, and/or distribute the final payment 152 to the debtor's creditors (508). In some exemplary embodiments, rather than a physical transfer via a printing network 150, the debtor funds may be transferred electronically to a deposit account held by a Chapter 13 bankruptcy trustee 112.

The system 500 can then obtain all of the relevant data with respect to the debtor's 111 payment to the trustee 112 from the plurality of networks and/or entities involved, e.g., the EFT network 140, the deposit account/originating account 142, the secure deposit account 144, the printing network 150, the delivery network 160, and the like (509). Similar to the verification step 502 discussed above, system 500 can then report the data obtained from the plurality of networks and/or entities involved to the debtor 111, e.g., the debtor 111, the debtor's trustee 112, the debtor's attorney 113, any representative of the debtor 111, and the like, via a communication method, e.g., the network 101, email, letter, and the like (510). In particular, the verification 180 communicates the data obtained from the plurality of networks and/or entities involved in a form and manner comprehensible to a debtor 111, e.g., a graphical user interface, and can occur, e.g., after the final payment 152 has been deposited by the trustee 112, after particular steps of the process as discussed herein, after each step of the process as discussed herein, and the like.

Figure 9:
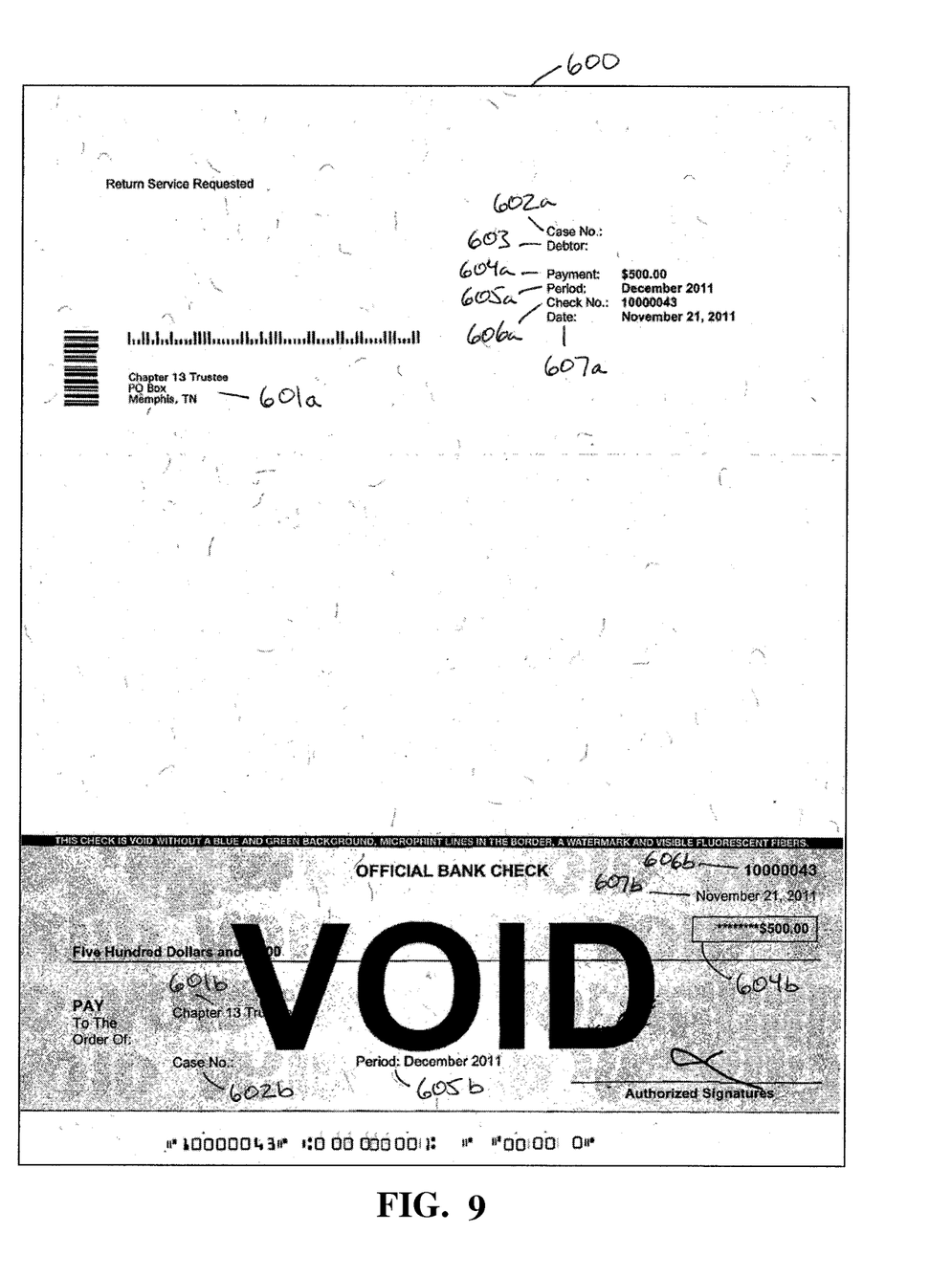
FIG. 9 is an exemplary bankruptcy trustee check as implemented by the exemplary bankruptcy trustee payment systems described herein.

Turning now to FIG. 9, an exemplary redacted bankruptcy trustee check 600 is depicted as implemented by the exemplary bankruptcy trustee payment systems discussed herein. In particular, the bankruptcy trustee check 600 can include a check portion and a receipt portion including corresponding notations as required and/or specified by the bankruptcy trustee 112, e.g., the bankruptcy trustee name and address 601a and 601b, the bankruptcy case number 602a and 602b, the debtor name 603, the payment amount 604a and 604b, the period 605a and 605b, the check number 606a and 606b, the date 607a and 607b, and the like.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A computer-implemented method for a debtor to pay a trustee, the method comprising:
    providing, by a processing device, bankruptcy case information relating to the debtor to a database;
    verifying, by the processing device, the bankruptcy case information provided to the database against a public bankruptcy database to confirm an accuracy of the bankruptcy case information relating to the debtor;
    upon verification of the bankruptcy case information, providing, by the processing device, debtor bank information relating to the debtor to the database;
    transmitting, by the processing device, the bankruptcy case information and the debtor bank information to a plurality of networks via a communications network, wherein the plurality of networks include at least one electronic fund transfer vendor;
    initiating, by the processing device, an electronic fund transfer of debtor funds from the debtor based on the bankruptcy case information and the debtor bank information;
    delivering a payment of the debtor funds to the trustee; and
    providing real-time feedback to the debtor, by the processing device, regarding a status of at least one of: the verifying step, the transmitting step, the initiating step, and the delivering step.

2. The method of claim 1, wherein the bankruptcy case information comprises at least one of a bankruptcy case number, a debtor name, and a trustee address, and wherein the debtor bank information comprises at least one of a debtor bank routing number and a debtor bank account number.

3. The method of claim 1, comprising creating, via the processing device, a schedule for delivering the payment to the trustee, wherein the schedule includes at least one of payment amount, a payment occurrence, and a payment reoccurrence.

4. The method of claim 1, wherein the public database is a bankruptcy court database.

5. The method of claim 1, wherein the electronic fund transfer is a one-time electronic fund transfer or a recurring electronic fund transfer.

6. The method of claim 5, wherein the electronic fund transfer is performed via the at least one electronic fund transfer vendor.

7. The method of claim 5, wherein the one-time electronic fund transfer and the recurring electronic fund transfer are automated.

8. The method of claim 1, wherein the bankruptcy case information and the debtor bank information is transmitted, via the processing device, to the plurality of networks in a standardized form.

9. The method of claim 8, wherein the standardized form provides the bankruptcy case information and the debtor bank information to the plurality of networks in an easily accessible and understood form.

10. The method of claim 1, wherein initiating, by the processing device, the electronic fund transfer of the debtor funds from the debtor based on the bankruptcy case information and the debtor bank information comprises withdrawing, by the processing device, the debtor funds from an originating account and depositing the debtor funds in a secure account, wherein the debtor funds are inaccessible to the debtor from the secure account.

11. The method of claim 9, wherein the secure account is a third-party bank account.

12. The method of claim 10, wherein withdrawing, by the processing device, the debtor funds from the originating account and depositing the debtor funds in the secure account, thereby making the debtor funds inaccessible to the debtor from the secure account, transforms the debtor funds from unsecure debtor funds to secure debtor funds.

13. The method of claim 9, comprising transforming the debtor funds deposited in the secure account into a payment form, wherein the payment form is a bankruptcy trustee approved payment form.

14. The method of claim 1, wherein the plurality of networks include at least one of a payment printing vendor and a payment delivery vendor.

15. The method of claim 1, comprising providing real-time feedback, by the processing device, related to at least one action taken by the plurality of networks.

16. The method of claim 15, wherein the real-time feedback is at least one of verification data and deficiency data.

17. A computer-implemented system for a debtor to pay a trustee, the system comprising:
    a computer storage device to store bankruptcy case information and debtor bank information relating to the debtor; and
    a processing device to (i) verify the bankruptcy case information against a public database to confirm an accuracy of the bankruptcy case information, (ii) transmit the bankruptcy case information and the debtor bank information to a plurality of networks via a communications network, wherein the plurality of networks include at least one electronic fund transfer vendor, (iii) initiate an electronic fund transfer of debtor funds from the debtor based on the bankruptcy case information and the debtor bank information, (iv) deliver a payment of the debtor funds to the trustee, and (v) provide real-time feedback regarding a status of at least one of the verifying step, the transmitting step, the initiating step, and the delivering step.

18. The computer-implemented system of claim 17, comprising a graphical user interface (GUI) for providing the bankruptcy case information and the debtor bank information relating to the debtor to the computer storage device.

19. The computer-implemented system of claim 17, wherein the processing device stores in the computer storage device information related to delivery of the payment of the debtor funds to the trustee for access by the debtor.

20. A non transitory computer readable medium storing instructions, wherein execution of the instructions by a processing device causes the processing device to implement a method, comprising:
   providing, via the processing device, bankruptcy case information relating to a debtor to a database;
   verifying, via the processing device, the bankruptcy case information provided to the database against a public database to confirm an accuracy of the bankruptcy case information relating to the debtor;
   upon verification of the bankruptcy case information, providing, via the processing device, debtor bank information relating to the debtor to the database;
   transmitting, via the processing device, the bankruptcy case information and the debtor bank information to a plurality of networks via a communications network, wherein the plurality of networks include at least one electronic fund transfer vendor;
   initiating, via the processing device, an electronic fund transfer of debtor funds from the debtor based on the bankruptcy case information and the debtor bank information;
   delivering a payment of the debtor funds to the trustee; and
   providing real-time feedback to the debtor, via the processing device, regarding a status of at least one of: the verifying step, the transmitting step, the initiating step, and the delivering step.

* * * * *